US006891776B2

(12) United States Patent
Moerig

(10) Patent No.: US 6,891,776 B2
(45) Date of Patent: May 10, 2005

(54) VIBRATOR SWEEP SHAPING METHOD

(75) Inventor: Rainer Moerig, Houston, TX (US)

(73) Assignee: WesternGeco, L.L.C., Houston, TX (US)

( * ) Notice: Subject to any disclaimer, the term of this patent is extended or adjusted under 35 U.S.C. 154(b) by 122 days.

(21) Appl. No.: 10/234,963

(22) Filed: Sep. 4, 2002

(65) Prior Publication Data
US 2004/0044478 A1 Mar. 4, 2004

(Under 37 CFR 1.47)

(51) Int. Cl.[7] .................................................. G01V 1/37
(52) U.S. Cl. ............................. 367/24; 367/22; 367/23; 367/32; 367/42; 367/49; 702/14; 702/17; 381/71.12
(58) Field of Search .............................. 367/22, 23, 24, 367/32, 38, 42, 49; 702/14; 381/71.12

(56) References Cited

U.S. PATENT DOCUMENTS

| 5,347,494 A | | 9/1994 | Andersen | 367/42 |
| 5,400,299 A | | 3/1995 | Trantham | 367/38 |
| 6,161,076 A | * | 12/2000 | Barr et al. | 702/17 |
| 6,381,544 B1 | * | 4/2002 | Sallas et al. | 702/17 |
| 6,522,974 B2 | * | 2/2003 | Sitton | 702/17 |
| 6,687,619 B2 | * | 2/2004 | Moerig et al. | 702/14 |
| 2002/0091487 A1 | * | 7/2002 | Moerig et al. | 702/2 |

FOREIGN PATENT DOCUMENTS

WO          2004023163      *   3/2001

OTHER PUBLICATIONS

Ii, X P, Decomposition of vibroseis data by multiple filter technique, Geophysics, vol. 62, #3, PP 980–991, 6/97.*
Nowicki et al, On the behavior of instantaneous frequency ..., Ultrasound in medicine and biology, vol. 16, #5, pp 511–518.*
Messer et al, Closed loop autocorrelator ... IEE proceedings F, vol. 133, #1, pp 25–33, 1/86.*
Roberts, J H, Autocorelation functions arsing ..., Electronics Letters, vol. 6, #26, PP 863–864, 12/70.*
E. Rietsch, "Vibroseis Signals With Prescribed Power Spectrum", Geophysical Prospecting, vol. 25, pp. 613–620.

* cited by examiner

Primary Examiner—Nelson Moskowitz
(74) Attorney, Agent, or Firm—Moser, Patterson & Sheridan

(57) ABSTRACT

This invention relates to improved methods to generate shaped sweeps, and for the acquisition of vibroseis data with a shaped pilot sweep.

19 Claims, 9 Drawing Sheets

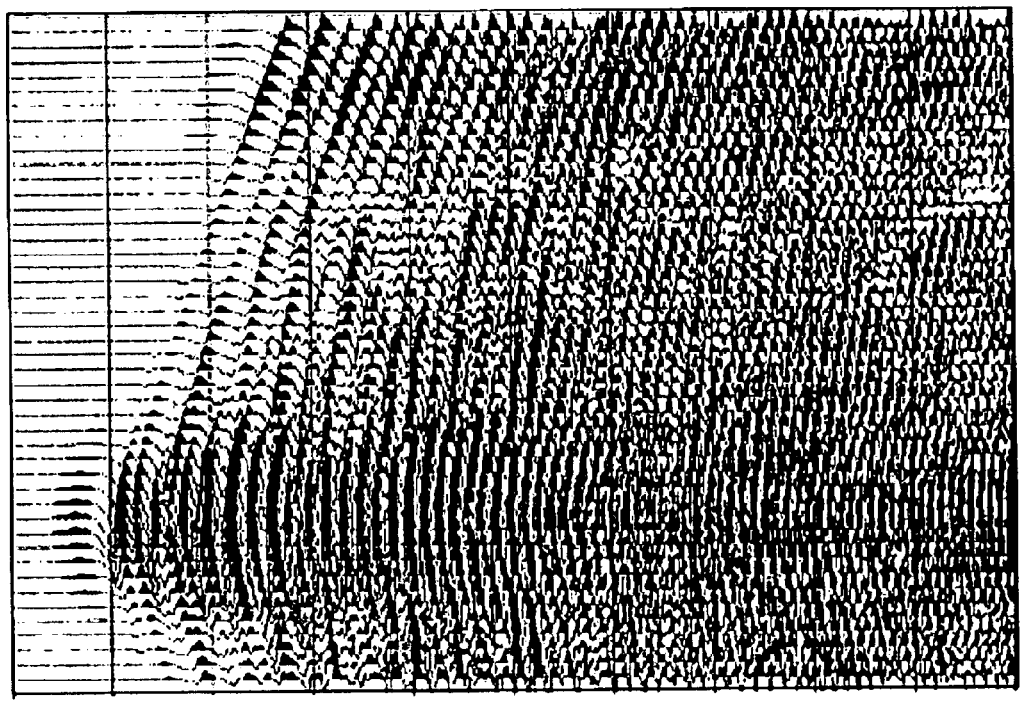
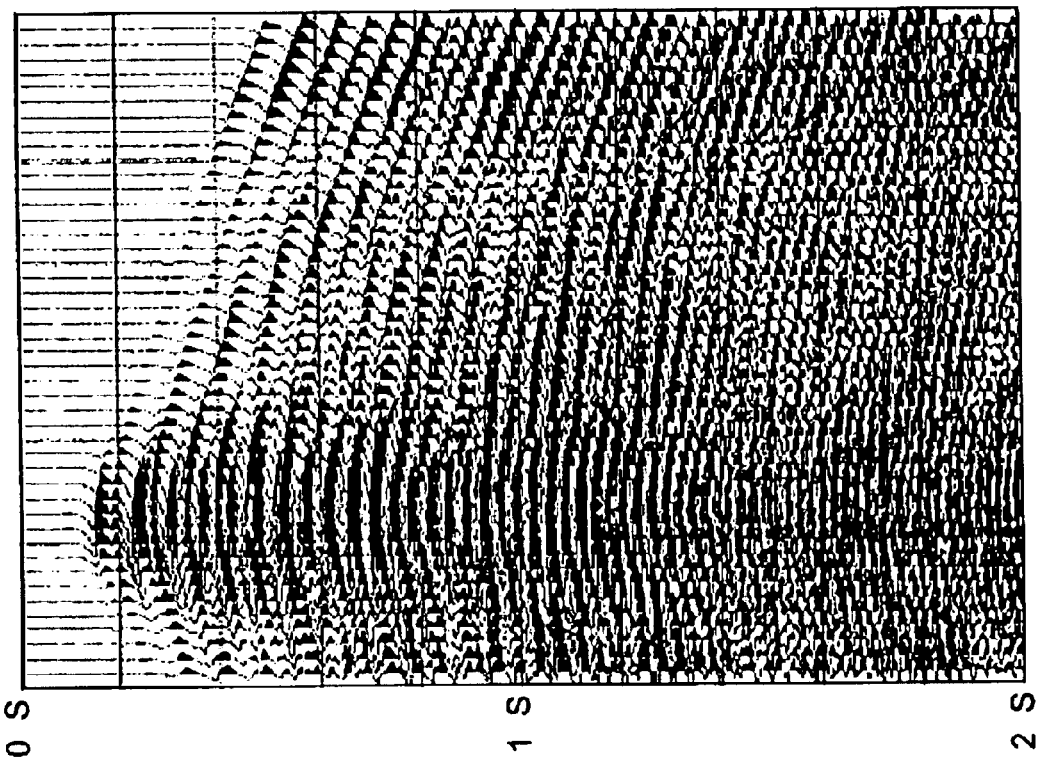
FIG. 6A
FIG. 6B

VIBRATOR SWEEP SHAPING METHOD

BACKGROUND OF THE INVENTION

In the acquisition of seismic data, seismic waves are used to determine the nature, orientation and location of subsurface geological formations. In the late 1950s, Conoco, Inc., pioneered the development of a new type of geophysical prospecting technique, now generally known as "vibroseis" prospecting. Vibroseis prospecting employs a seismic vibrator used to generate a controlled wavetrain that propagates through the earth to be detected by seismic detectors. The vibrator operator selects an energization (sweep) interval, along with a subsequent period during which the vibrator is not energized. Reflected signals are received both during the time when the vibrator is energized and when it is not. Typically, the energization takes the form of a sinusoidal vibration of continuously varying frequency applied to the surface of the earth (or in a body of water) during a sweep period lasting from about two to about 20 seconds or even more.

Various types of sweeps are possible, each employing some sort of amplitude taper applied at the beginning and at the end of the sweep to insure the amplitude of the sweep goes to zero smoothly at its endpoints. The frequency of the sweep may be varied linearly or nonlinearly with time. The standard signal is a linear sweep. A linear sweep is a sinusoidal-type signal having an essentially constant amplitude envelope where the frequency of the signal varies linearly with time, either increases or decreases monotonically within a given frequency range, and yields a constant sweep rate. A non-linear sweep is a sinusoidal-type signal where the frequency varies nonlinearly with time.

Recently, a new type of signal known as a "shaped-sweep" has been developed for use in vibroseis prospecting. Shaped-sweep technology is disclosed in, e.g., U.S. Pat. No. 5,347,494 to Andersen. One benefit of using a shaped-sweep is that the sweep is designed to have an autocorrelation pulse length and an impulse response spectrum that facilitates subsequent data processing activities.

In vibroseis, data that is generated from the vibratory source is correlated with a reference sweep to produce a correlated record. A reference sweep signal is, generally, an ideal signal that the vibrator is programmed to apply. The correlated record resembles a conventional seismic record, as one would receive with an explosive or impulsive seismic source.

It is well known in seismic art that an undesirable byproduct in vibration-generated seismic signals is "side lobe energy." Side lobes are byproducts of the correlation process and lengthen and complicate the desired correlated seismic wavelet. Visually, side lobe energy appears as small oscillations to either side of the central three lobes of the seismic wavelet. Side lobe energy degrades data quality and affects adversely the ability to estimate and control the seismic wavelet in processing. There is, therefore, a need to generate vibrator correlation data that have a simple wavelet shape with minimal side lobe energy. Such data would reduce seismic signal distortion and enhance seismic resolution.

In attempting to solve the side lobe problem, Rietsch, "Vibroseis Signals with Prescribed Power Spectrum," *Geophysical Prospecting*, Vol. 25, pp. 613–620 (1977), developed a relationship between a sweep's instantaneous phase function and its power spectral density for sweeps having a constant amplitude envelope. This relationship is based on the fact that the power spectrum of a sweep is inversely related to the rate of frequency change of the sweep. Rietsch proposed a method for determining an appropriate phase function for a sweep that has a certain predetermined power spectrum, noting that the method could be used to design sweeps with autocorrelation functions that had low side lobes. Sweeps having predefined power spectra could, theoretically, have been designed using this relationship; however, vibrator electronic control systems of that time could not accurately reproduce or follow a user-defined sweep.

Post Rietsch, the advent of new-generation vibrator control instruments based on advanced microprocessor technology allowed for tight control of the vibrator output force (both amplitude and phase). This advancement enabled user-defined sweeps to be more accurately reproduced and followed by the vibrator. For example, Andersen in U.S. Pat. No. 5,347,494, incorporated herein by reference in its entirety, adds to Rietsch's method for producing improved wavelet shapes with minimal side energy by using a feedback loop that compensates for the effects of a non-constant amplitude envelope (taper). Andersen further proposes certain power spectra that produce a substantially three-lobe wavelet. Both Rietsch and Andersen employ methods that relate a sweep's phase function to its power spectrum.

Recently developed cascaded sweep techniques suffer in part from the side lobe problem described above. In these techniques, multiple sweeps (segments) are linked end-to-end, output by the vibrator, and recorded with a single listen period at the end of the cascaded sweep. This significantly reduces the field time required to record the data as compared to conventional methods. The recorded cascaded sweep data are then correlated with a cascaded reference sweep sequence. The correlated data show, due to the cascading of the sweeps, a repetitive (segment) structure. As a result of this structure, side lobes of the first breaks in one segment may extend into a previous segment masking weak reflections and, thus, degrading the data quality.

There is a need in the art for effective and efficient methods to enhance the quality of vibroseis data. Such methods produce wavelets with minimal side lobe energy, solve the side lobe problem in cascaded sweep data, and provide shaped data when cascaded sweeps are used in simultaneous shooting with two or more vibratory sources.

SUMMARY OF THE INVENTION

The present invention provides methods for producing seismic wavelet shapes with minimal side lobe energy. The methods shape the instantaneous frequency of a sweep in order to obtain an autocorrelation wavelet that is a substantially three-lobe wavelet with minimal side lobe energy. The instantaneous frequency $f(t)$ is a non-linear function of time $t$ and may be represented by an nth degree polynomial. The polynomial is shaped by varying its coefficients and its degree until the desired autocorrelation wavelet is obtained. The methods of the present invention may be used for designing cascaded sweeps, and moreover, can be applied to cascaded sweeps performed with two or more simultaneous sources.

Thus, the methods comprise the steps of, first, shaping the instantaneous frequency of the pilot sweep; and, second, autocorrelation. A pilot sweep with a suitable instantaneous frequency will have an autocorrelation wavelet with minimal side lobe energy. In one embodiment of the present invention, the shaping step comprises computing the instantaneous frequency of the pilot sweep; damping the instantaneous frequency of the pilot sweep within the taper regions; computing an instantaneous phase of the pilot sweep; and computing a shaped pilot sweep. Also in this embodiment, the correlating step comprises computing an error between the autocorrelation function of the shaped sweep and the desired autocorrelation wavelet, and determining whether the computed error falls below a predetermined threshold value.

BRIEF DESCRIPTION OF THE DRAWINGS

So that the manner in which the above recited features of the present invention can be understood in detail, a more particular description of the invention, briefly summarized above, may be had by reference to the embodiments of the invention which are described in the present specification and illustrated in the appended drawings. It is to be noted, however, that the specification and appended drawings illustrate only certain embodiments of this invention and are therefore not to be considered limiting of its scope, for the invention may admit to other equally effective embodiments.

FIG. 6A is the first portion of raw data of a cascaded linear sweep.

FIG. 6B is the first portion of raw data of a cascaded shaped sweep for the same vibrator point as in FIG. 6A.

DETAILED DESCRIPTION OF THE INVENTION

The goal of shaped-sweep technology is to provide methods to shape a vibrator sweep to generate a simple wavelet shape with minimal side lobe energy after correlation. The pilot sweeps used to drive vibrators are, aside from the taper regions, constant amplitude sweeps. The most commonly used sweep in data acquisition is a linear sweep with a constant sweep rate (linear instantaneous frequency). However, non-linear sweeps also are commonly employed and are created by changing the sweep rate during sweeping. In so doing, the spectral content and the autocorrelation wavelet can be modified while maintaining a constant amplitude envelope. Non-linear sweeps are usually employed to compensate for the attenuation of the signal that occurs as the signal travels through geological formations. Yet regardless of whether the sweeps are linear or non-linear, the autocorrelation wavelets of these sweeps are multiple-lobe wavelets with, generally, only slowly decaying side lobes.

Unlike prior art methods, the methods of the current invention do not use the relationship between the pilot sweep's phase function and its power spectrum to minimize side lobe energy. Instead, in the methods of the current invention, the instantaneous frequency of a pilot sweep is shaped by an optimization process in order to obtain an autocorrelation wavelet that is virtually a three-lobe wavelet with minimal side lobe energy.

Figure 1:
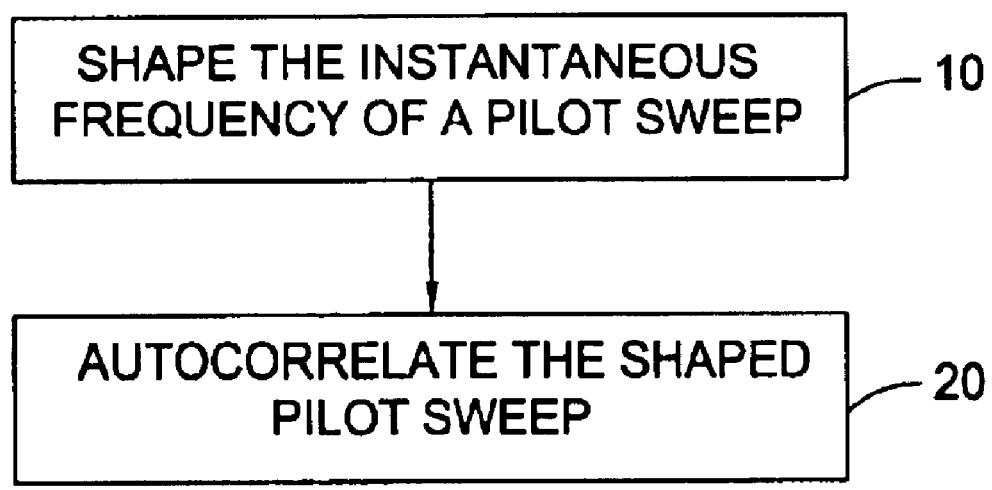
FIG. 1 depicts a flow diagram showing one embodiment of the basic method of the present invention.

FIG. 1 depicts a flow diagram of the method of the present invention. Generally, in step 10, an instantaneous frequency of a pilot sweep is shaped by application of an algorithm. Next, this pilot sweep is autocorrelated. In so doing, the autocorrelation wavelet produced has reduced side lobe energy.

Figure 2:
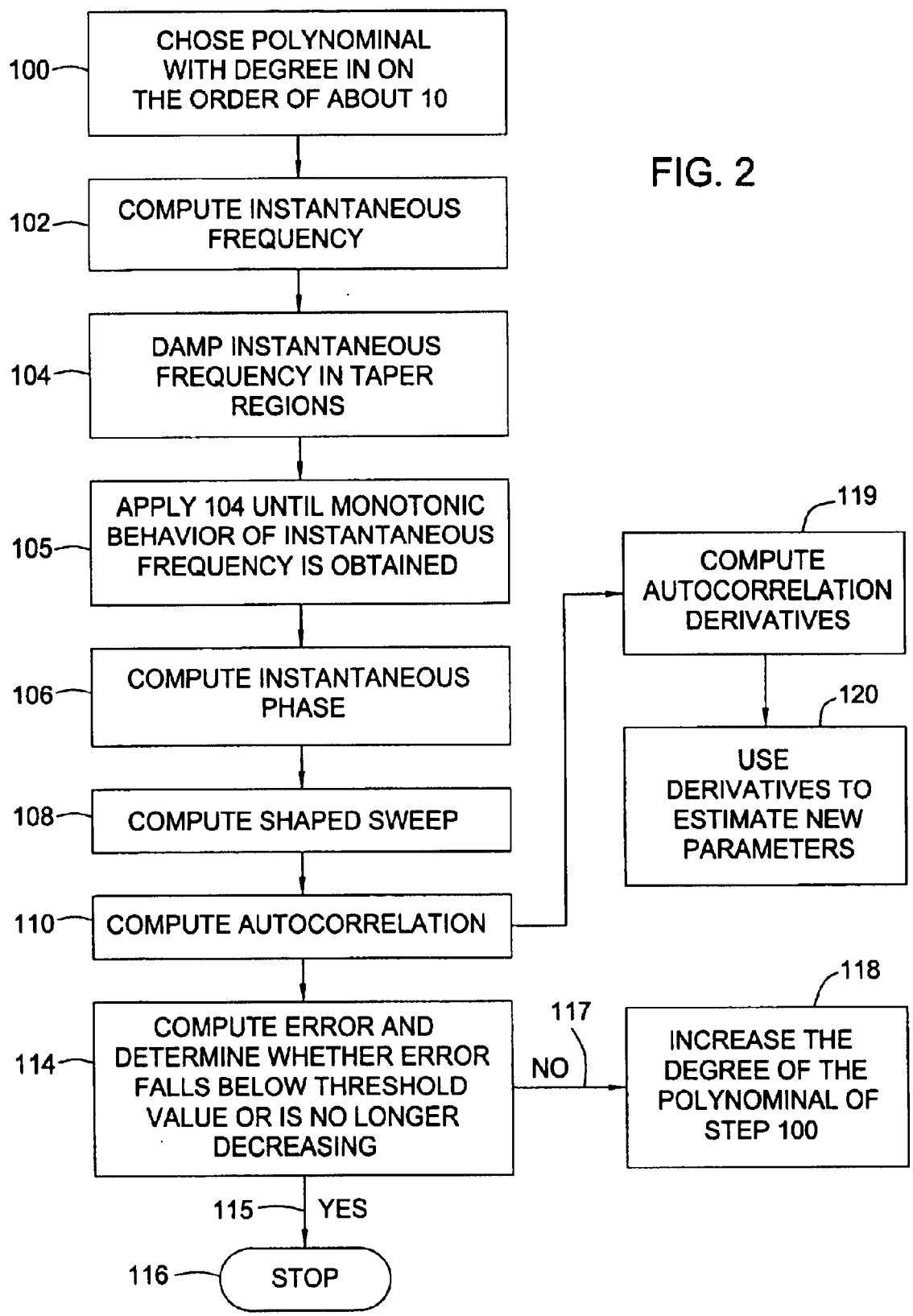
FIG. 2 depicts a flow diagram for one embodiment of the method of the present invention where the difference between a computed and desired autocorrection wavelet is minimized.

FIG. 2 depicts one embodiment of the method shown in FIG. 1. Referring to FIG. 2, a polynomial with a degree n on the order of, for example, about 10 is chosen (step 100). In step 102, the instantaneous frequency f(t) of the pilot sweep is computed. Instantaneous frequency f(t) is a non-linear function of time t and is represented by an nth degree polynomial $$f(t) = \sum_{i=0}^{n} a_i(t-\tau)^i, \tag{1}$$

where the coefficients $a_i$, the time shift $\tau$, and the degree n are parameters that are used to shape the sweep. Initial values for the parameters may be $$\tau = T/2 \tag{2}$$

$$a_0 = (f_1 + f_0)/2 = f_c \tag{3}$$

where T is the sweep length and $f_0$ and $f_1$ are the start and end frequency of a linear sweep that otherwise would have been used in the survey area. The value of $a_0$ will be approximately the center frequency $f_c$ of the correlation wavelet and should be chosen such that it is within the band of the recoverable frequencies in the survey area. The initial value for $a_1$ may be $$a_1 = (f_1 - f_0)/T \tag{4}$$

which is, as is well known, the sweep rate of a linear sweep. The initial values for the other coefficients (i>1) are $$a_i = 10^{-(i-2)} \text{ for } 2 \leq i \leq n$$

which is small enough to avoid numerical instabilities in the computation of the polynomial.

In addition, it is preferable to obtain an instantaneous frequency function: 1) that is positive for $0 \leq t \leq T$, and 2) where f increases monotonically with time. Both requirements, however, generally are not fulfilled at all points in time during the sweep. Particularly for polynomials of very high degree, f(t) in equation 1 tends to take on extreme large positive or negative values at both ends of the polynomial's support, i.e., within the taper regions.

Thus, in order to achieve the above properties, the instantaneous frequency function must be damped within the taper regions (step 104) of the pilot sweep. This is done by computing a weighted sum of the polynomial in equation 1 and another linear frequency function d(t):

$$f_s(t) = \begin{cases} f(t) \cdot (1 - w_u(t)) + d u(t) \cdot wu(t) & \text{for } 0 \leq t \leq t_{taper} \\ f(t) & \text{for } t_{taper} < t < T - t_{taper} \\ f(t) \cdot (1 - w_d(t)) + d_d(t) \cdot w_d(t) & \text{for } T - t_{taper} \leq t \leq T \\ \text{with } d_u(t) = f_{\min} + \frac{f(t_{taper}) - f_{\min}}{t_{taper}} \cdot t, \; w_u(t) = 1 - \frac{t}{t_{taper}} \\ \text{and } d_d(t) = f(T - t_{taper}) + \\ \quad \frac{f_{\max} - f(T - t_{taper})}{t_{taper}} \cdot (t - (T - t_{taper})), \\ w_d(t) = \frac{t - (T - t_{taper})}{t_{taper}} \end{cases} \quad (5)$$

where $d_u$ and $d_d$ are the linear frequency functions in the up- and down-taper regions. $w_u$ and $w_d$ are the corresponding weighting functions, $f_{min}$ and $f_{max}$ are user-specified frequency limits, and $t_{taper}$ is the taper length assumed in this embodiment to be of equal length in the up- and down-taper regions. Equation 5 provides the damped instantaneous frequency using a linear damping function d(t). Instead of using linear functions, other embodiments might employ quadratic functions.

Figure 3A:
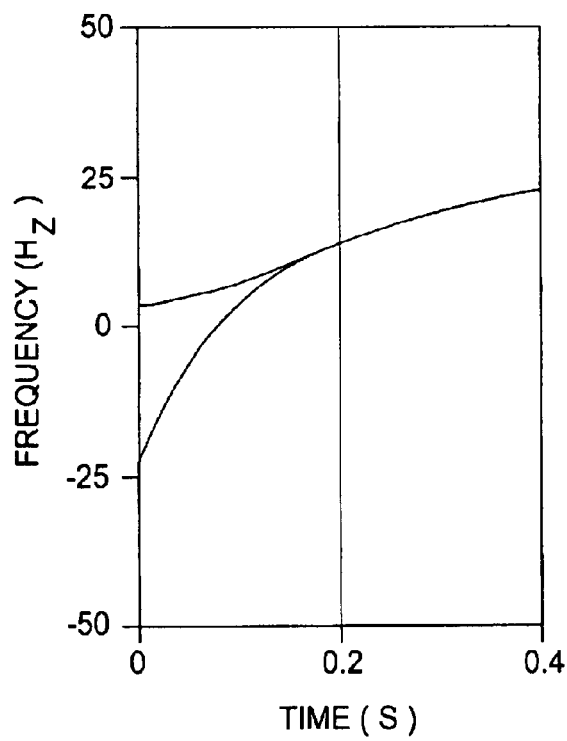
FIG. 3A is a graph of the instantaneous frequency at the beginning of a shaped four-second sweep.
Figure 3B:
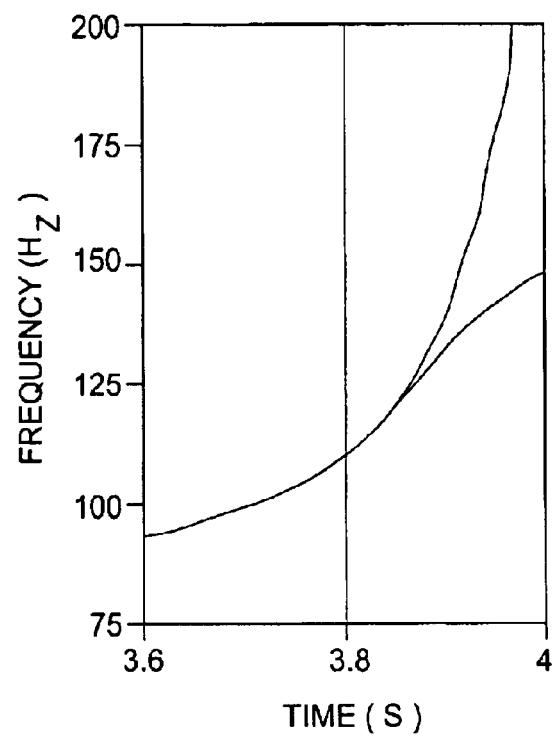
FIG. 3B is a graph of the instantaneous frequency at the end of a shaped four-second sweep.

Equation 5 guarantees that the instantaneous frequency function $f_s(t)$ starts at $f_{min}$ and ends at $f_{max}$. However, it does not guarantee that $f_s(t)$ is indeed a monotonic function. Therefore, equation 5 is applied repeatedly until monotonic behavior of the instantaneous frequency is obtained (step 105). Instantaneous frequency was determined for a shaped four-second sweep employing equations 1 and 5 of the present invention. The results obtained within the taper regions of the shaped sweep can be seen in FIG. 3. The taper region of the sweep is 0.2 seconds long. The curve labeled "original polynomial" is the instantaneous frequency according to equation 1. The curve labeled "damped polynomial" is the instantaneous frequency after repeated applications of equation 5 with $f_{min}$=3 Hz and $f_{max}$=150 Hz.

Once monotonic behavior is attained, the instantaneous phase is computed (step 106). The instantaneous phase Φ(t) is the integral of the instantaneous frequency $f_s(t)$:

$$\phi(t) = 2\pi \int_o^t f_S(t) dt \quad (6)$$

The integration in equation 6 is performed numerically. Next, the shaped sweep is computed (step 108), given by:

$$S(t) = A(t) \cdot \sin[\phi(t) + \phi_0] \quad (7)$$

where A(t) is the amplitude envelope and $\phi_0$ is the initial phase.

The autocorrelation of S(t) is computed (step 110) and compared to the desired autocorrelation wavelet. The error, the sum of the squares of the difference between the computed and desired autocorrelation wavelet, is computed and stored (step 114). Once the error is computed, a determination is made as to whether the error falls below a threshold value (or is not decreasing in subsequent iterations) (step 114). If the answer to the determination at step 114 is yes, the error is below the threshold value (or is not decreasing in subsequent iterations), the process is stopped (step 116). If the error is not below the threshold value, an additional iteration of the process is performed.

The process employs an optimization process such as the Levenberg-Marquart method (Press, Teukolsky, Vetterling, Flannery, Numerical Recipes, Cambridge University Press) to continue to minimize the difference between the computed and desired autocorrelation wavelet. Instead of using the Levenberg-Marquart method, one with skill in the art may select any other optimization algorithm suitable to minimize the error. The optimization process involves reiterating steps 100–110. In this iterative process, the degree of the polynomial of step 100 is increased by, for example, 1 (n+1) (step 118). Additionally, derivatives of the autocorrelation function at step 110 are determined (step 119) and are used to estimate new parameters (step 120). Finally, the new polynomial (n+1) (step 118) and the new parameters (step 120) are used to calculate another, further optimized, instantaneous frequency (steps 102–114).

Figure 4:
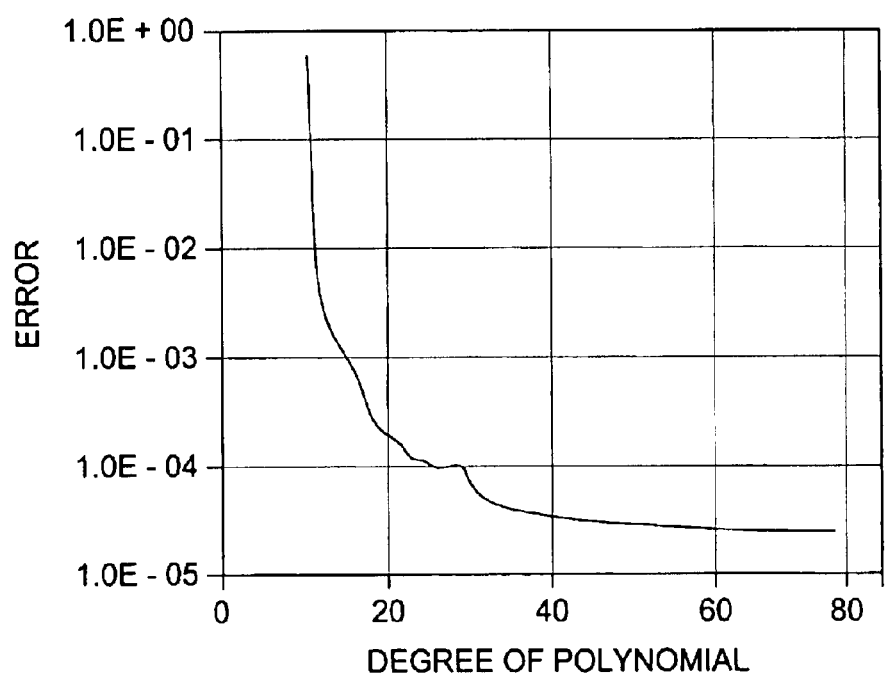
FIG. 4 depicts error development during the shaping of a sweep with a 50 Hz Ricker autocorrelation wavelet.

FIG. 4 shows the development of error during the sweep shaping process of the present invention with a desired autocorrelation wavelet that is a 50 Hz Ricker wavelet. In this example, the error essentially stops decreasing when the degree of the polynomial approaches 60.

EXAMPLE 1

Figure 5A:
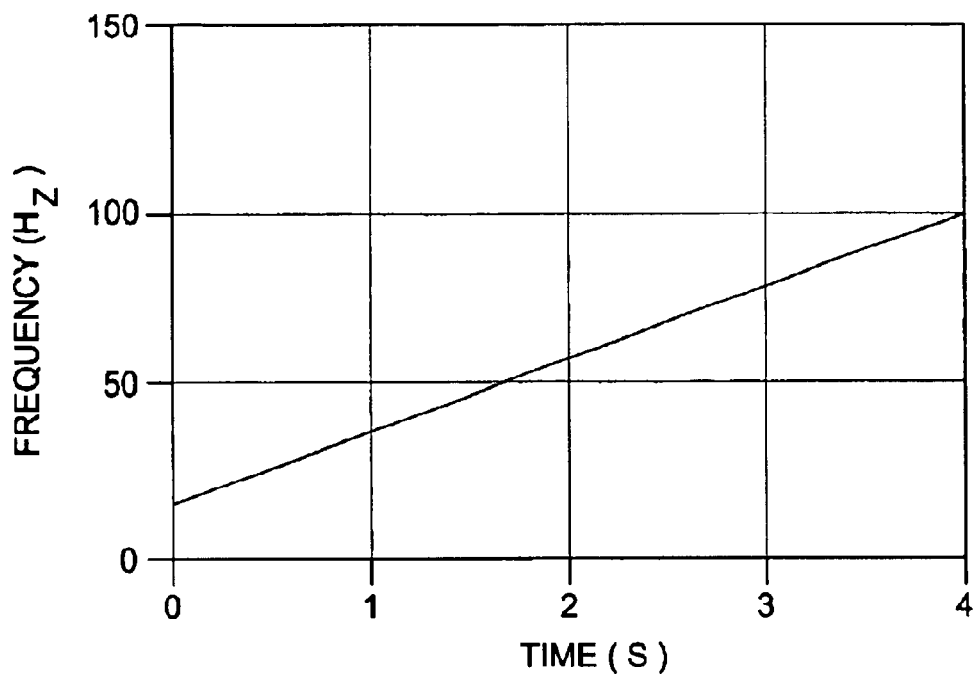
FIG. 5A is a graph of the instantaneous frequency of a linear sweep.
Figure 5B:
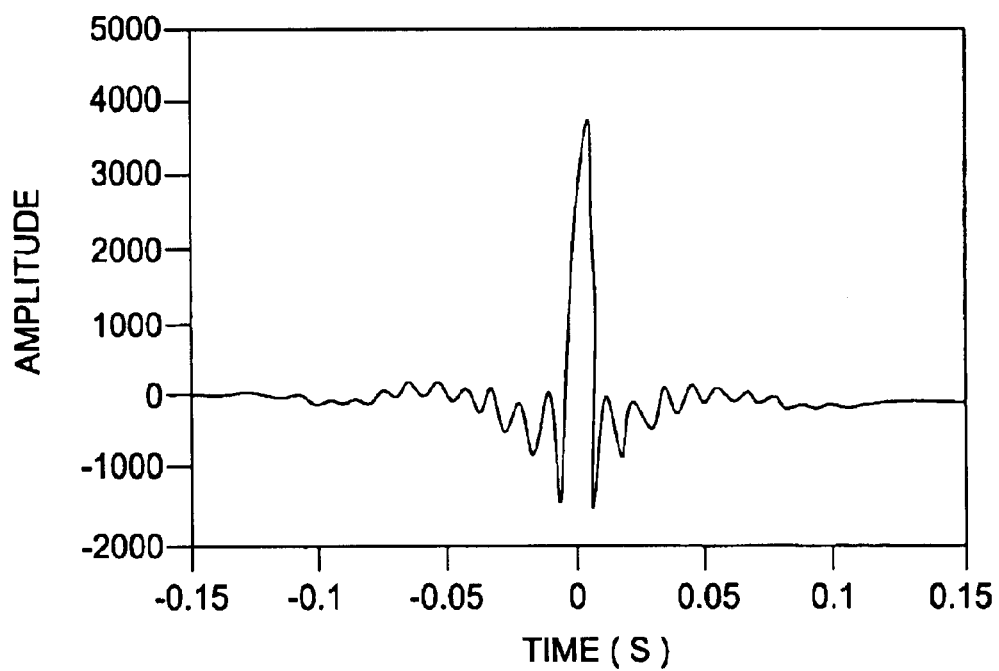
FIG. 5B is an autocorrelation wavelet of a linear sweep.
Figure 5C:
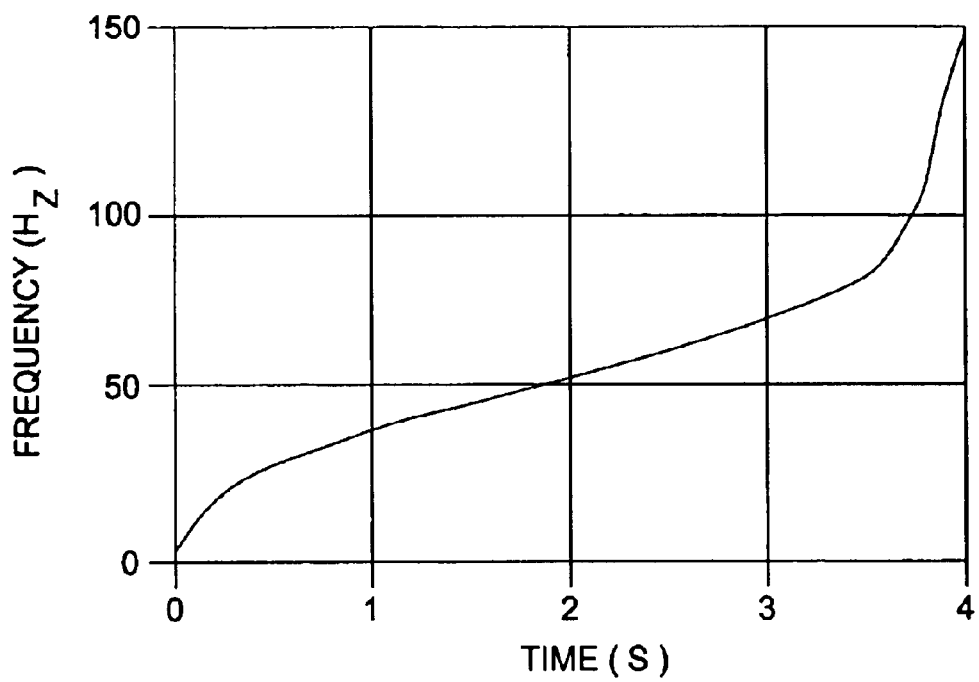
FIG. 5C is a graph of the instantaneous frequency of a shaped sweep.
Figure 5D:
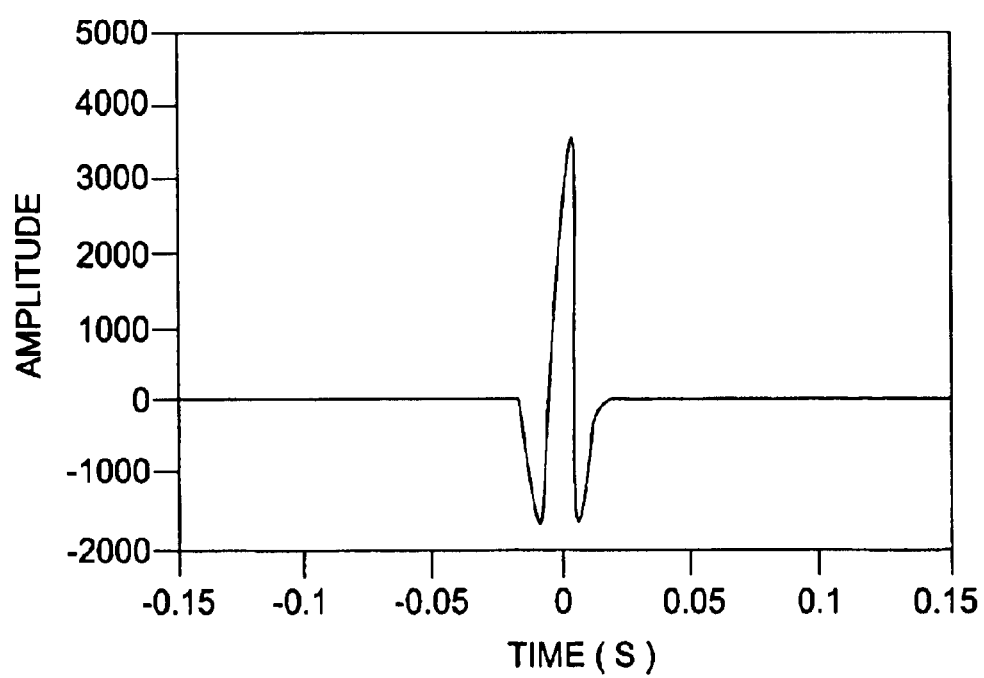
FIG. 5D is an autocorrelation wavelet of a shaped sweep.

FIGS. 5A-D compare the instantaneous frequency functions and the autocorrelation wavelets of a conventional linear 10–100 Hz sweep (FIGS. 5A and 5B) and a sweep shaped using the methods of the present invention and having a center frequency of 50 Hz (FIGS. 5C and 5D). Both sweeps were four seconds in duration and the taper length was 0.2 seconds. The start and end frequency $f_{min}$ and $f_{max}$ used in equation 5 for the shaped sweep were 3 Hz and 150 Hz, respectively. At the end of the up-taper (t=0.2 seconds) the frequency of the shaped sweep is about 15 Hz and at the beginning of the down-taper (t=3.8 seconds) the frequency of the shaped sweep is about 110 Hz. The side lobe level in the autocorrelation of the shaped sweep is about 60 dB below the main lobe of the three-lobe wavelet.

EXAMPLE 2

FIGS. 6A and 6B show the first portion of raw cascaded sweep data using a linear sweep (FIG. 6A), and a sweep shaped by the methods of the present invention (FIG. 6B) for the same geological model. The data contain fifth order harmonic distortion, five segments plus a listen period in length, where each segment and listen period length is four seconds long. The initial phases of the segments are 0, 144 288, 72, and 216 degrees.

Figures 7A, 7B:
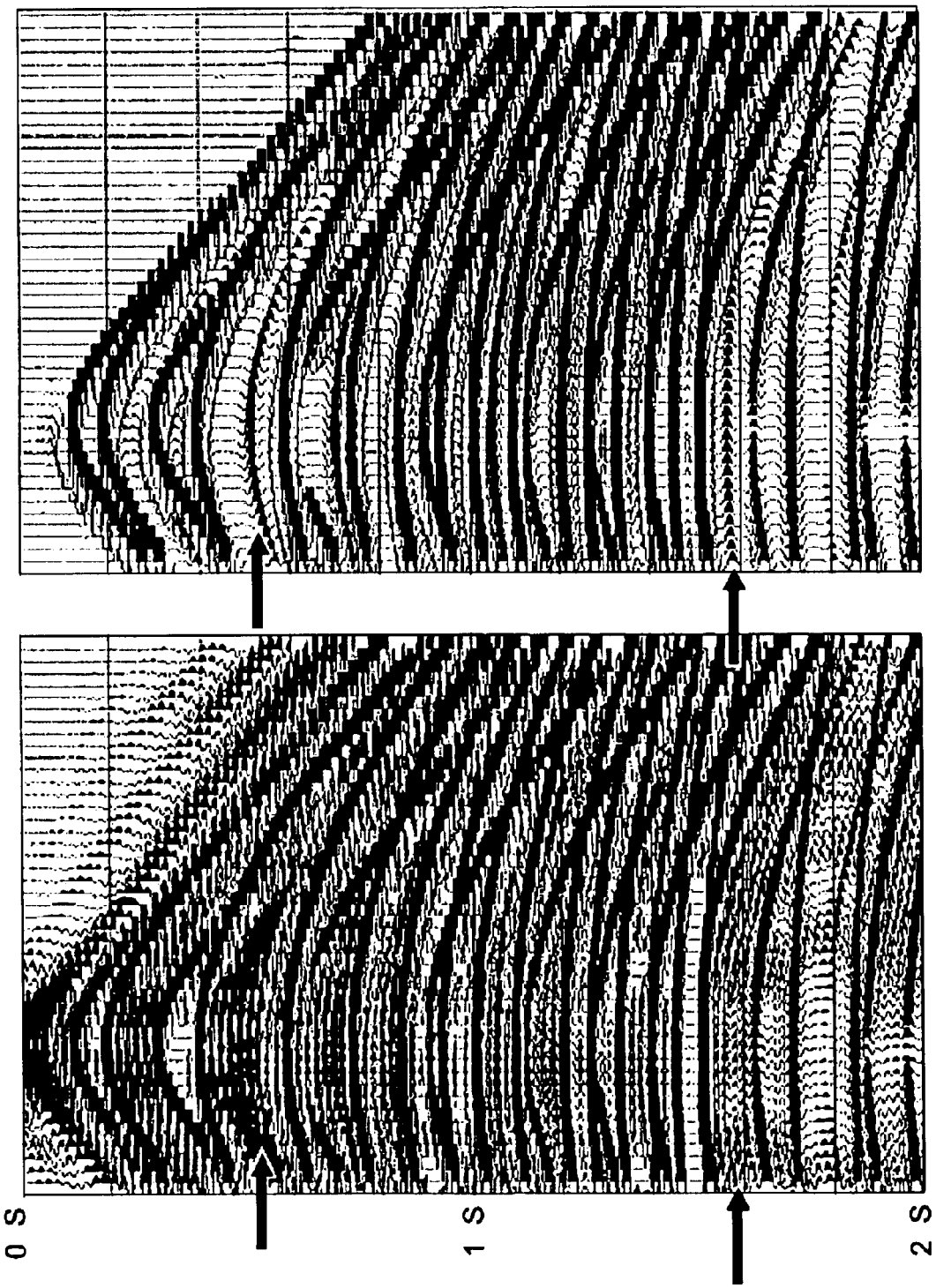
FIG. 7A is the seismic data of FIG. 6A after correlation using a linear sweep.
FIG. 7B is the seismic data of FIG. 6B after correlation using a shaped sweep.

FIGS. 7A and 7B display correlated data (of FIGS. 6A and 6B) after correlation with a linear (FIG. 7A) and a shaped (FIG. 7B) sweep. The improvement in the quality of data employing a shaped sweep is apparent. The linear sweep data look "noisy" compared to the shaped sweep data. The onset of the first breaks in the shaped sweep data is much clearer and better defined than in the linear sweep data, and may serve to improve statics. Furthermore, the high level side lobes in the linear sweep data mask weak reflections that are clearly visible in the shaped sweep data (marked by arrows).

Figure 8A:
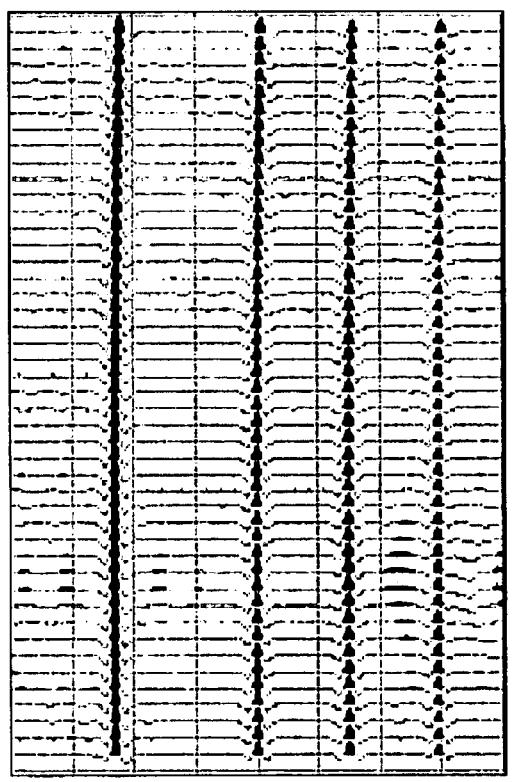
FIG. 8A is the last portion of correlated sweep data of a linear sweep.
Figure 8B:
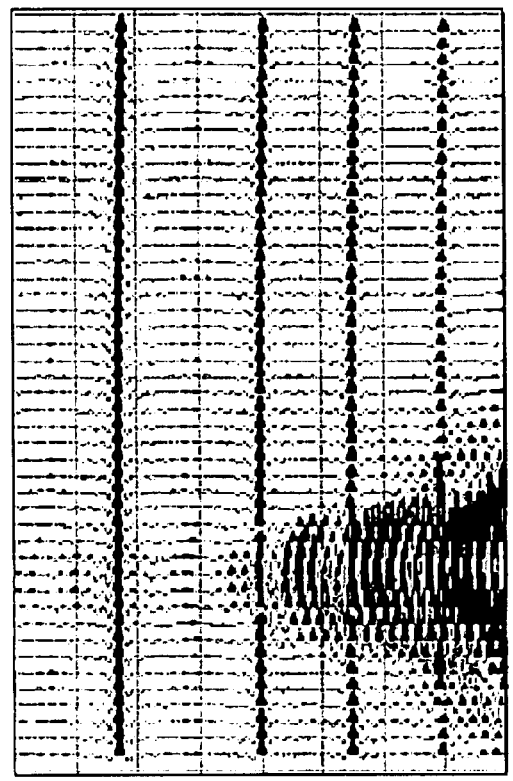
FIG. 8B is the last portion of correlated sweep data of a shaped sweep.

FIGS. 8A and 8B show the last portion of correlated data of a linear (FIG. 8A) and a shaped (FIG. 8B) sweep. The high amplitude noise with hyperbolic move-out seen in the linear sweep data covering the late in-coming reflections (seen in FIG. 8A) is the side lobe energy of phase-shifted first breaks in the subsequent segment. This effect is usually pronounced and often affects one or two seconds of the correlated data. When a shaped sweep is used, however, this effect is much less severe due to the strong suppression of the side lobes (FIG. 8B).

EXAMPLE 3

Figure 9C:
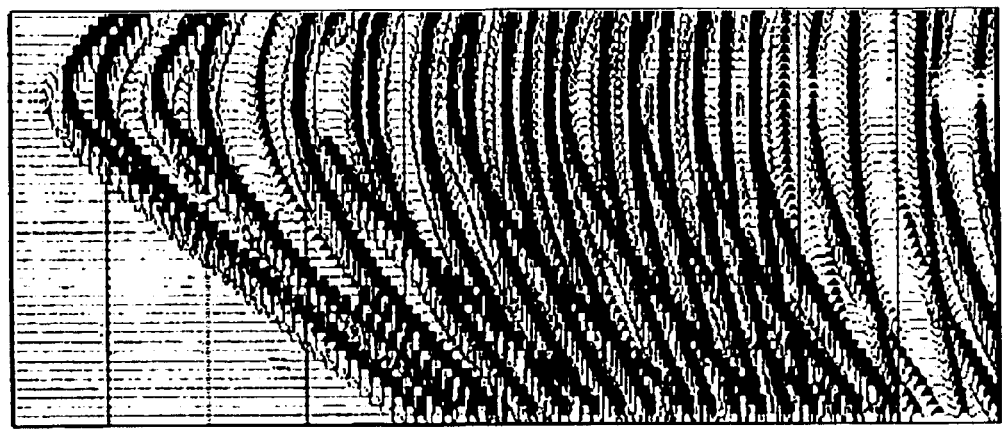
FIG. 9C is separated and compressed data for the right source of the cascaded sweep data of FIG. 9A.
Figure 9B:
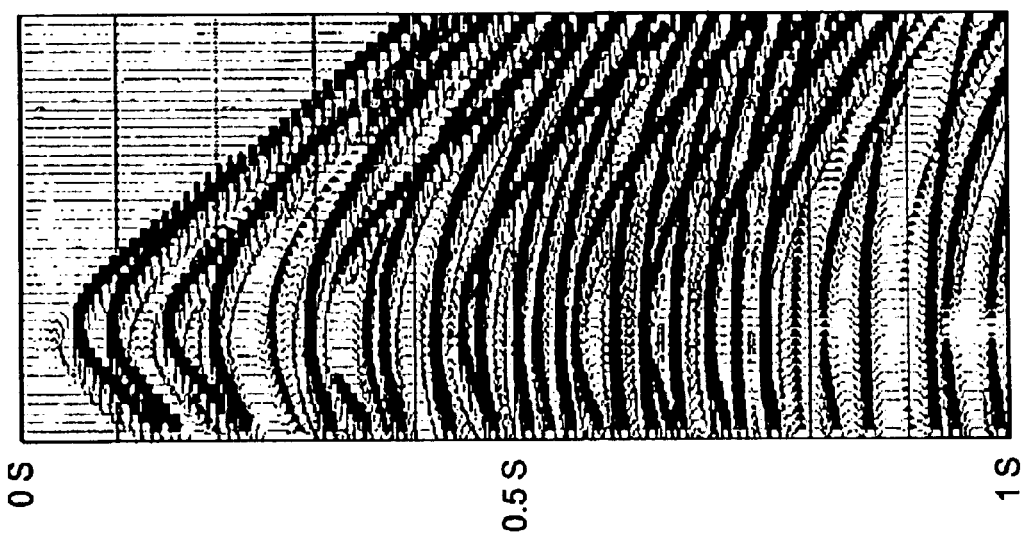
FIG. 9B is separated and compressed data for the left source of the cascaded sweep data of FIG. 9A.
Figure 9A:
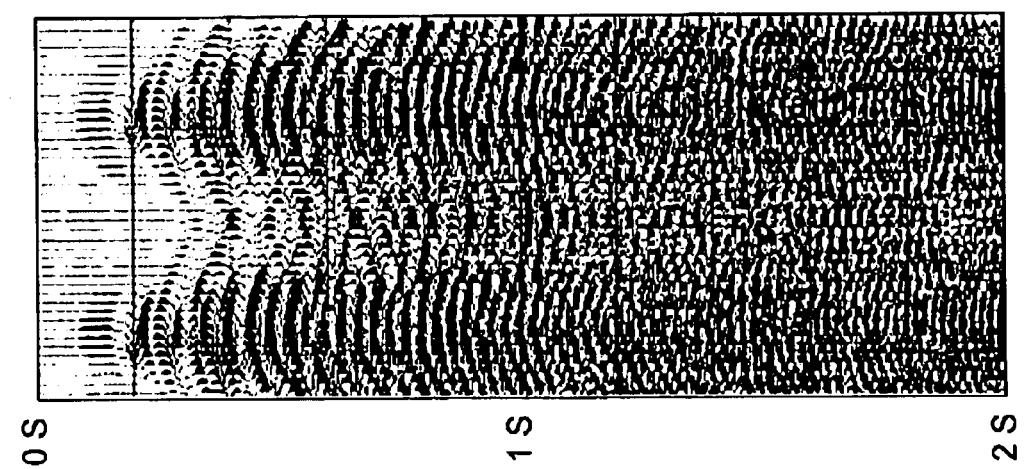
FIG. 9A is raw data of cascaded shaped sweeps acquired with two simultaneous sources.

FIGS. 9A-C show cascaded shaped sweep data acquired with two simultaneous sources. When using a single source or vibrator set, a result similar to those shown in FIGS. 7B and 8B for the shaped sweep can be obtained using a linear sweep for data acquisition and applying a shaping filter in data processing. The shaping filter converts the measured ground force into the desired wavelet. How well this works, however, depends on how well the measured ground force represents the actual ground force put into the ground. Moreover, such post-acquisition data shaping does not work well on correlated cascaded sweep data, due to the first breaks' side lobes creeping in from the next segment.

Furthermore, post-acquisition data shaping fails completely on raw cascaded sweep data that are acquired with two or more sources simultaneously. The simultaneous sources are to be separated first without compressing the sweeps (maintaining raw data) before a shaping filter could be applied to accomplish the data shaping. The source separation is possible if certain phase rotation schemes are used, but would slow down production significantly. Therefore, the post-acquisition shaping of multiple-source data is considered to be impractical.

On the other hand, pre-acquisition shaping—the deployment of shaped sweeps—is not affected by the number of simultaneous sources, as can be seen in FIGS. 9A-C. FIG. 9A shows the raw data from cascaded sweeps acquired with two simultaneous sources using shaped sweeps. FIG. 9B shows shaped sweep data from the left source that has been separated and compressed by correlation. FIG. 9C shows the corresponding data from the right source.

The equations set forth above are illustrative examples of equations that can be used to shape the instantaneous frequency of a sweep in order to obtain a three-lobe autocorrelation wavelet with minimal side lobe energy, according to the methods of the present invention. However, these equations should not be considered as limiting the scope of the invention. Those skilled in the art will recognize that the particular equations used to implement shaping instantaneous frequency are a matter of convenience and personal preference, and derivatives thereof can be used effectively as well.

What is claimed is:

1. A method of reducing side lobe energy of a wavelet representing an autocorrelation of a pilot sweep, comprising:
   shaping an instantaneous frequency of the pilot sweep; and
   autocorrelating the pilot sweep.

2. The method of claim 1, wherein the shaping step comprises computing the instantaneous frequency of the pilot sweep.

3. The method of claim 2, wherein the instantaneous frequency is represented by an nth degree polynomial.

4. The method of claim 3, wherein the nth degree polynomial is greater than about 10.

5. The method of claim 2, wherein the instantaneous frequency of the pilot sweep is computed by $$f(t) = \sum_{i=0}^{n} a_i(t-\tau)^i. \tag{1}$$

6. The method of claim 5, wherein initial parameters are $$\tau = T/2 \tag{2}$$

$$a_0 = (f_1 + f_0)/2 = f_c \tag{3}$$

7. The method of claim 2, wherein the shaping step further comprises damping the instantaneous frequency of the pilot sweep within taper regions.

8. The method of claim 7, wherein the instantaneous frequency of the pilot sweep within the taper regions are damped by $$f_s(t) = \begin{cases} f(t) \cdot (1 - w_u(t)) + d_u(t) \cdot w_u(t) & \text{for } 0 \le t \le t_{taper} \\ f(t) & \text{for } t_{taper} < t < T - t_{taper} \\ f(t) \cdot (1 - w_d(t)) + d_d(t) \cdot w_d(t) & \text{for } T - t_{taper} \le t \le T \\ \text{with } d_u(t) = f_{\min} + \dfrac{f(t_{taper}) - f_{\min}}{t_{taper}} \cdot t, \; w_u(t) = 1 - \dfrac{t}{t_{taper}} \\ \text{and } d_d(t) = f(T - t_{taper}) + \\ \qquad \dfrac{f_{\max} - f(T - t_{taper})}{t_{taper}} \cdot (t - (T - t_{taper})), \\ w_d(t) = \dfrac{t - (T - t_{taper})}{t_{taper}} \end{cases} \tag{5}$$

9. The method of claim 8, comprising the further step of applying equation 5 repeatedly until the instantaneous frequency of the pilot sweep within the taper regions behaves monotonically.

10. The method of claim 2, wherein the shaping step further comprises computing an instantaneous phase of the pilot sweep.

11. The method of claim 10, wherein the instantaneous phase of the pilot sweep is computed by $$\phi(t) = 2\pi \int_o^t f_s(t)dt. \tag{6}$$

12. The method of claim 2, wherein the shaping step further comprises computing a shaped pilot sweep.

13. The method of claim 12, wherein the shaped pilot sweep is computed by $$S(t) = A(t) \cdot \sin[\phi(t) + \phi_o] \tag{7}$$

14. The method of claim 1, wherein the shaping step comprises:
   computing an instantaneous frequency of the pilot sweep;
   damping an instantaneous frequency of the pilot sweep within the taper regions;
   computing an instantaneous phase of the pilot sweep; and
   computing a shaped pilot sweep.

15. The method of claim 14, further comprising after the damping step, continuing damping until the instantaneous frequency within the taper regions behaves monotonically.

16. The method of claim 1 wherein the autocorrelating step further comprises computing an error between the computed and desired autocorrelation wavelet.

17. The method of claim 16, wherein the autocorrelating step further comprises determining whether the computed error falls below a threshold value.

18. The method of claim 17, further comprising increasing the degree of the polynomial if the computed error does not fall below a threshold value.

19. The method of claim 1, further comprising computing derivatives of the autocorrelation function of the pilot sweep.

* * * * *